(12) United States Patent
Ronald et al.

(10) Patent No.: US 8,777,230 B2
(45) Date of Patent: Jul. 15, 2014

(54) DEVICE FOR SECURING A TOOL TO A SPINDLE

(75) Inventors: Craig R. Ronald, Fairport, NY (US); Matthew C. Meyer, Spencerport, NY (US); David J. Senecal, Ontario, NY (US); Daniel D. Wood, Macedon, NY (US); Kenneth E. Glasow, Spencerport, NY (US)

(73) Assignee: The Gleason Works, Rochester, NY (US)

( * ) Notice: Subject to any disclaimer, the term of this patent is extended or adjusted under 35 U.S.C. 154(b) by 518 days.

(21) Appl. No.: 13/096,083

(22) Filed: Apr. 28, 2011

(65) Prior Publication Data

US 2012/0098214 A1    Apr. 26, 2012

Related U.S. Application Data

(60) Provisional application No. 61/331,039, filed on May 4, 2010.

(51) Int. Cl.
*B23B 31/22*    (2006.01)
(52) U.S. Cl.
USPC ........................... 279/2.12; 279/2.23; 279/66
(58) Field of Classification Search
USPC ............ 279/2.12, 2.23, 66, 2.1, 2.11, 75, 905
See application file for complete search history.

(56) References Cited

U.S. PATENT DOCUMENTS

| 4,350,463 | A | | 9/1982 | Friedline |
| 4,572,047 | A | * | 2/1986 | Punater et al. ................... 83/481 |
| 4,958,968 | A | * | 9/1990 | von Haas et al. ............. 409/232 |
| 6,196,094 | B1 | * | 3/2001 | Erickson .......................... 82/158 |
| 6,612,791 | B1 | * | 9/2003 | Haimer .......................... 409/232 |
| 2007/0001408 | A1 | | 1/2007 | Soltis et al. |
| 2009/0270020 | A1 | * | 10/2009 | Klein et al. ................... 451/541 |

FOREIGN PATENT DOCUMENTS

| DE | 3835879 C1 | 1/1990 |
| FR | 2580743 A1 | 10/1986 |
| GB | 1204711 A | 9/1970 |
| WO | 80/00139 A1 | 2/1980 |

OTHER PUBLICATIONS

International Search Report and Written Opinion for PCT/US2011/034226.

* cited by examiner

*Primary Examiner* — Eric A Gates
*Assistant Examiner* — Chwen-Wei Su
(74) *Attorney, Agent, or Firm* — Robert L. McDowell

(57) ABSTRACT

A tool securing device capable of clamping a tool to a machine spindle as well as assisting in the removal of a tool from a machine spindle, all in a tool-less manner. The tool securing device includes distal means to be releasably gripped by a machine draw bar as well as means to releasably engage a tool.

8 Claims, 4 Drawing Sheets

DEVICE FOR SECURING A TOOL TO A SPINDLE

This application claims the benefit of U.S. Provisional Patent Application No. 61/331,039 filed May 4, 2010 the entire disclosure of which is hereby incorporated by reference.

FIELD OF THE INVENTION

The present invention is directed to machinery, in particular metal-removing machinery, and an apparatus for securing a tool to a spindle of a machine.

BACKGROUND OF THE INVENTION

In machining, particularly metal removing machining such as cutting and/or grinding processes for manufacturing gears and other toothed articles, it is known to attach and secure a rotary tool (e.g. face milling cutter, face hobbing cutter, grinding wheel, etc.) to the spindle of a machine via one or more threaded bolts (i.e. clamping bolts) that extend into the face of a rotatable tool spindle.

In some instances, a rotary tool is secured to a machine spindle by extending a threaded center clamping bolt through the tool head and into the spindle where the end of the center bolt is brought into engagement with a machine draw bar. The draw bar is retracted to exert a pulling force on the center bolt thereby drawing the tool into contact with the machine spindle and clamping the tool thereto.

With the types of attachment means discussed above, some type of tool, such as a hand-held or pneumatic tool (e.g. wrench) may be required to tighten and/or loosen the clamping bolts. Once the bolts have been loosened and, if applicable, the draw bar has been advanced, removal of the rotary tool from the machine spindle may require additional tools and/or back-off screws to break contact between the tool and the machine spindle. Such tightening and/or loosening operations may be quite time consuming thereby resulting in significant machine down time.

With the trend toward higher productivity and less machine down time, a manner of securing a tool to a spindle is sought that is faster and involves fewer additional tools than what is currently practiced in the art.

SUMMARY OF THE INVENTION

The present invention is directed to a tool securing device capable of clamping a tool to a machine spindle as well as assisting in the removal of a tool from a machine spindle, all in a tool-less manner. The tool securing device includes distal means to be releasably gripped by a machine draw bar as well as means to releasably engage a tool.

DETAILED DESCRIPTION OF THE PREFERRED EMBODIMENT

Figure 1:
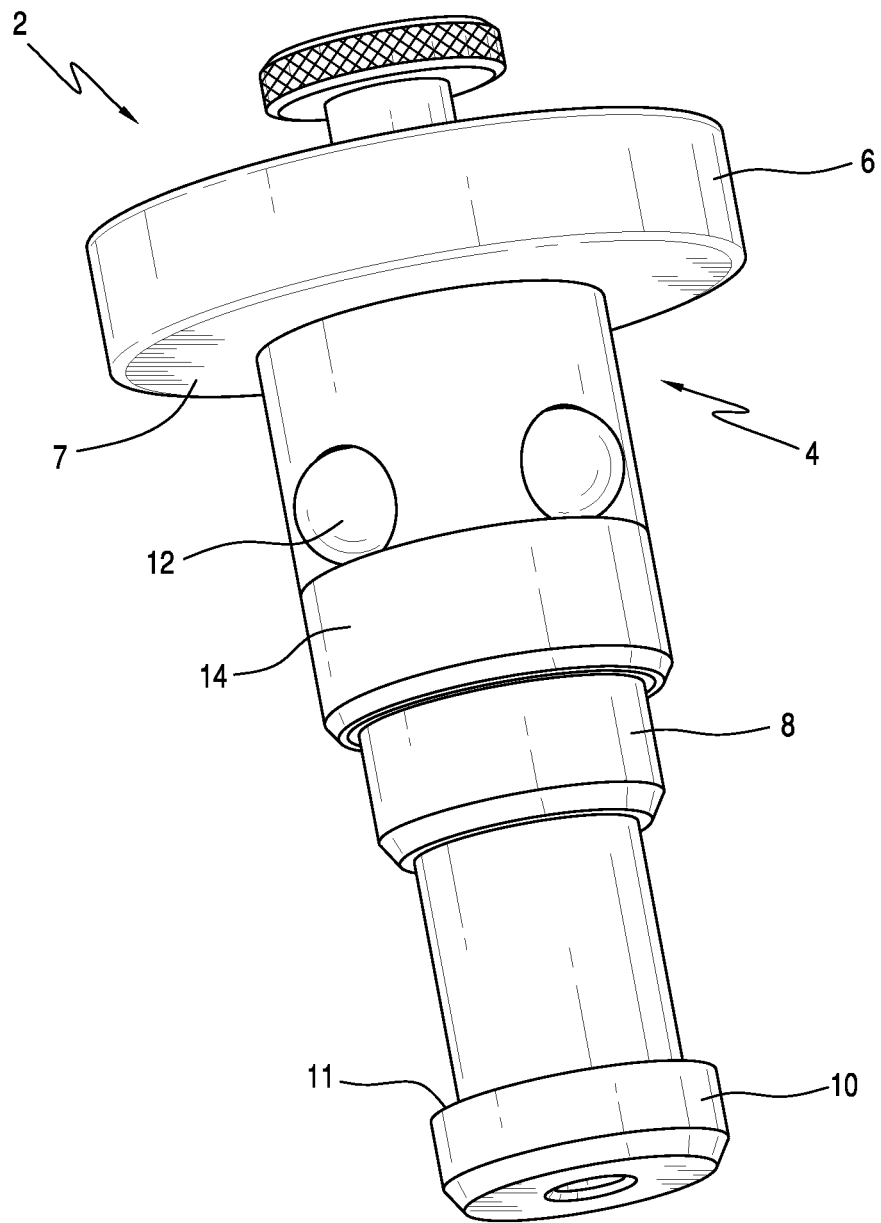
FIG. 1 is an elevated view of the tool securing device of the present invention.

Before any features and at least one construction of the invention are explained in detail, it is to be understood that the invention is not limited in its application to the details of construction and the arrangements of the components set forth in the following description or illustrated in the drawings. The invention is capable of other constructions and of being practiced or being carried out in various ways. Also, it is understood that the phraseology and terminology used herein is for the purposes of description and should not be regarded as limiting.

FIG. 1 shows a tool securing device 2 according to the present invention. The device 2 comprises an axially-extending body portion 4 having a generally circular cross-section and including a proximal flange portion or head 6, shank portion 8 and distal retention knob 10. Located at a predetermined distance along the length of the shank portion 8 is a plurality, preferably three or more, of balls 12 (e.g. steel balls) positioned in radially-extending openings 17 spaced circumferentially about the shank portion 8, preferably at equidistant intervals. Balls 12 are held in the tool securing device 2 by a cover sleeve 14.

Figure 2:
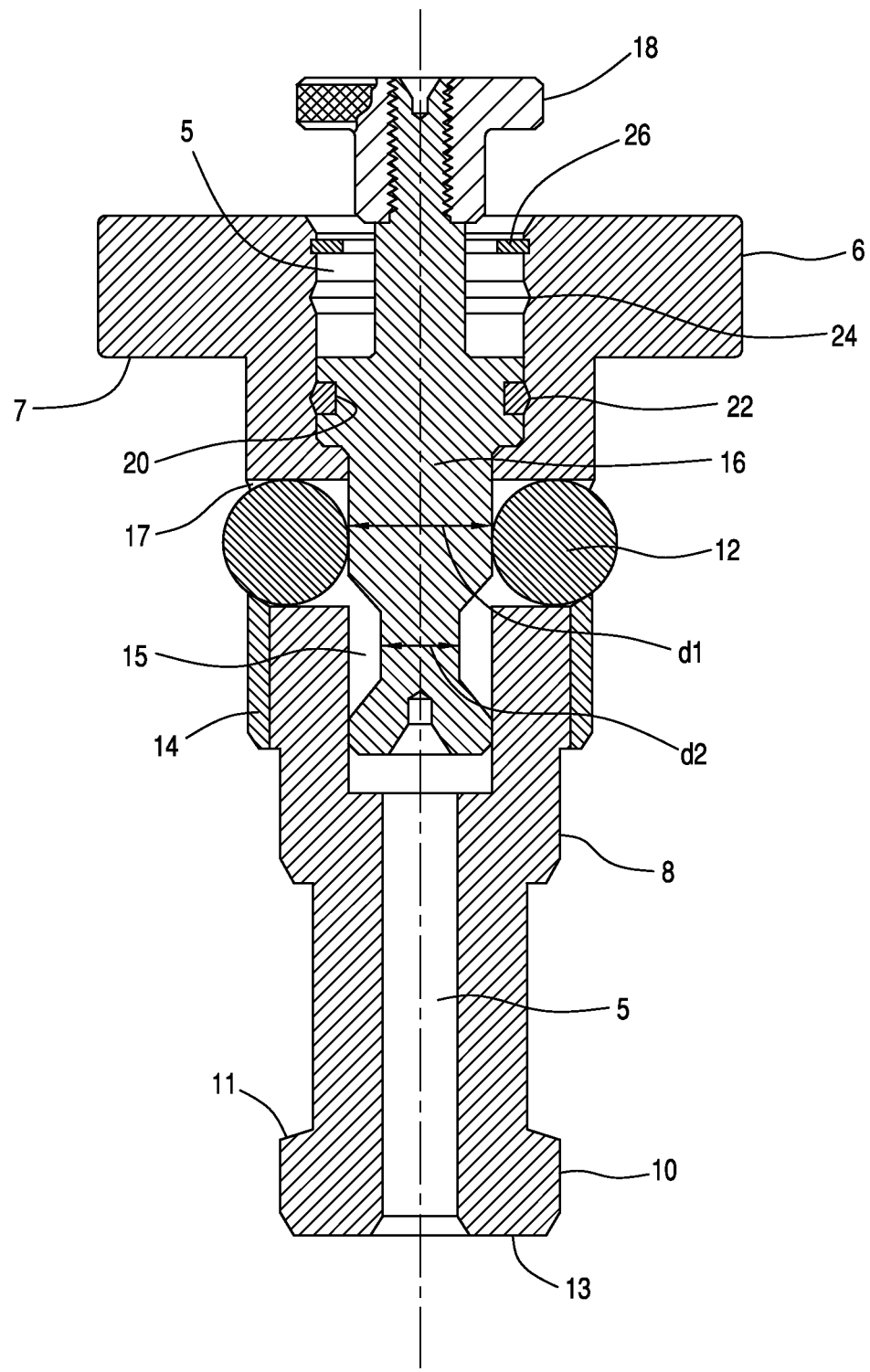
FIG. 2 is an axial cross-sectional view of the inventive tool securing device.

Tool securing device 2 further includes an internal plunger 16 (FIGS. 2-4) to which a push/pull knob 18 is attached, preferably via threads, at one end thereof. Plunger 16 is movable within an axially-extending internal bore 5 of body portion 4 of tool securing device 2 between positions whereby balls 12 are urged into a radially outward position, or released therefrom, due to different plunger diameter portions located near to the other end of plunger 16. Namely, an advanced position (shown in FIGS. 1-4) having a first diameter portion, $d_1$, whereby balls 12 are urged into their radially outward position, and a retracted position (not shown) where balls 12 are movable inward from their radially outward position due to a reduced second diameter portion, $d_2$, thereby creating a cavity-like region 15 wherein the balls 12 may at least partially reside.

Internal plunger 16 may further comprise a seal 20 (e.g. O-ring) located about the periphery of an upper portion thereof with seal 20 being positionable in a first detent 22 of bore 5 when plunger 16 is in the advanced position, and a second detent 24 of bore 5 when plunger 16 is in the retracted position. A snap ring 26 may be included to prevent the unintentional removal of plunger 16 from bore 5 as well as to prevent any process by-products (e.g. fluids or metal chips) from infiltrating bore 5.

Figure 3:
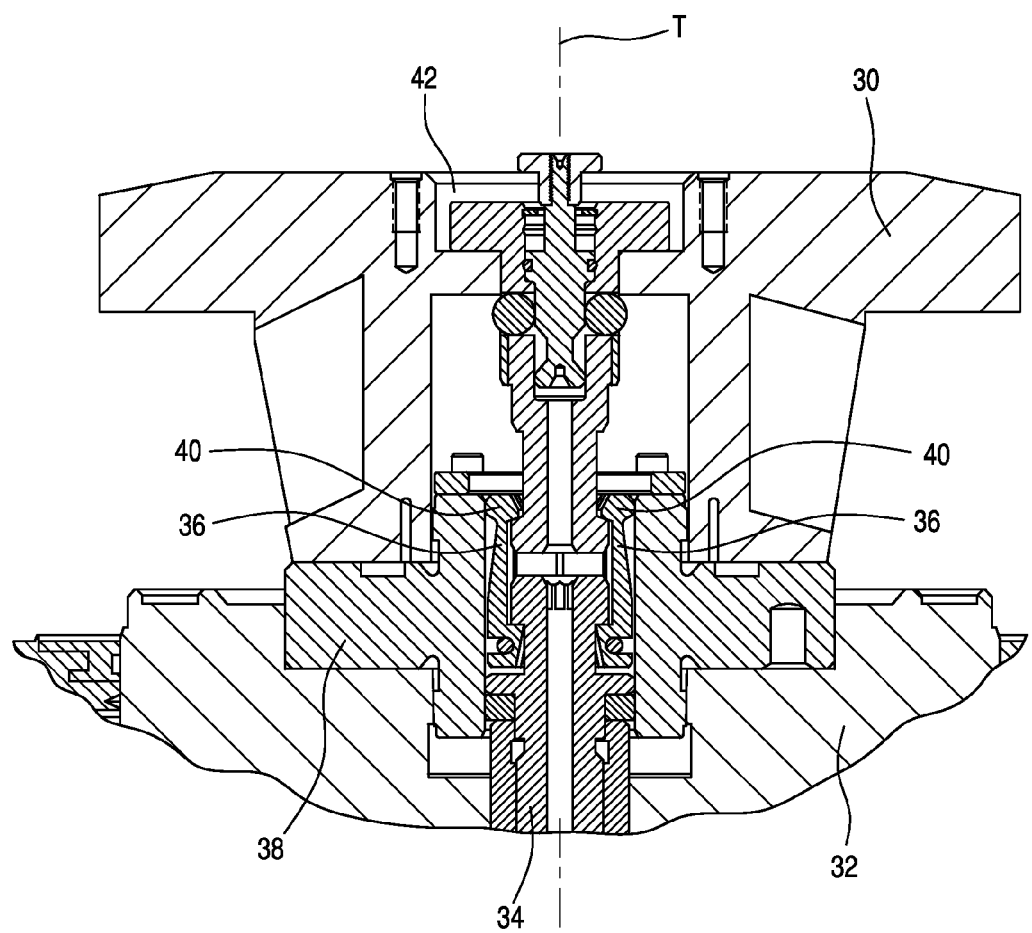
FIG. 3 is an axial cross-sectional view of the inventive tool securing device positioned to secure a tool to a machine spindle.
Figure 4:
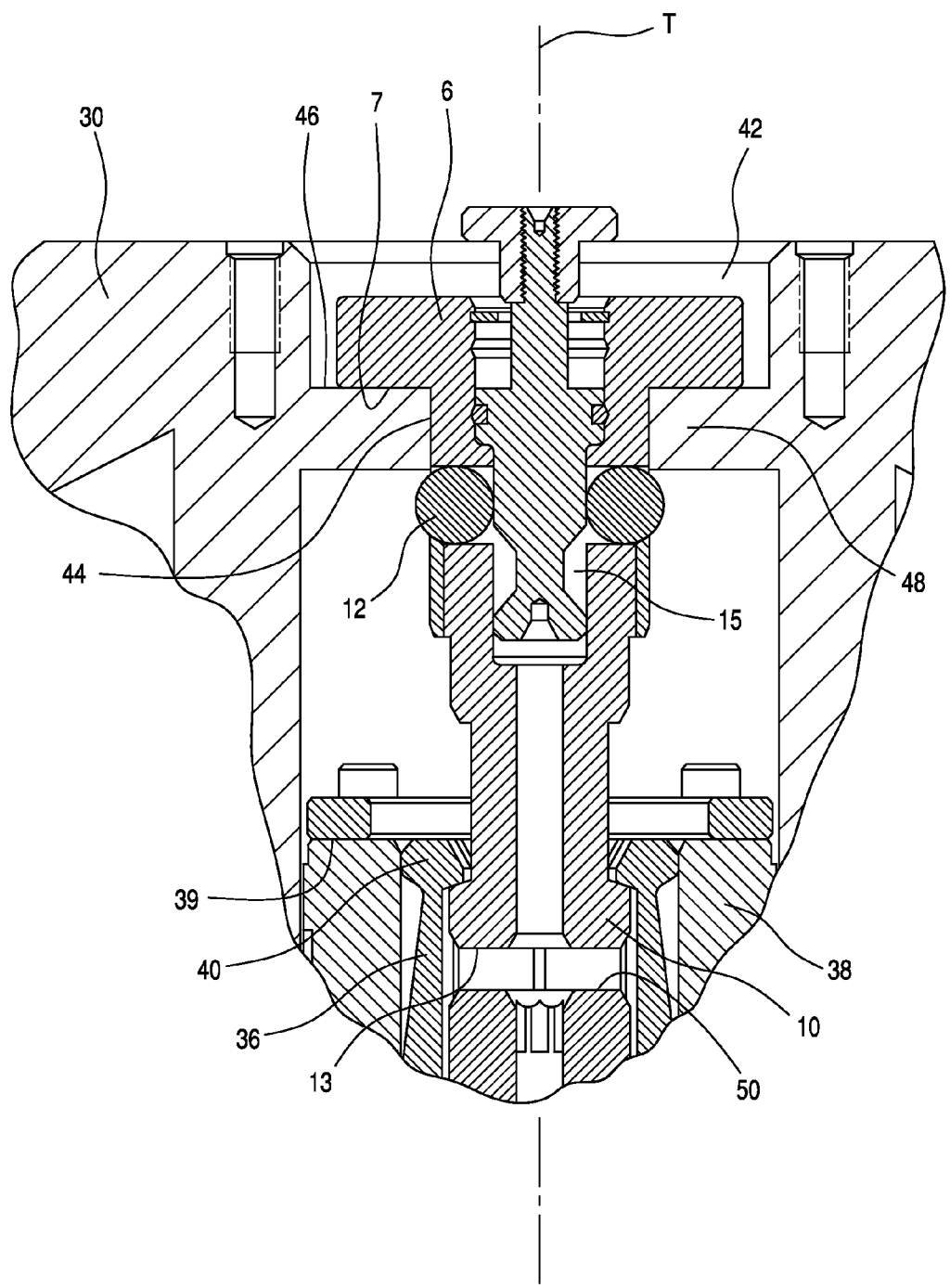
FIG. 4 is an enlarged view of FIG. 3.

FIGS. 3 and 4 show the tool securing device 2 in position to secure a rotary tool 30 (e.g. cutting tool, grinding wheel) to a tool spindle 32 of a machine (e.g. gear manufacturing machine) for rotation about tool axis T. Located within tool spindle 32 is a draw bar 34 which is axially movable within tool spindle 32 and is connected at its inner end to a plurality of gripping fingers 36 located within housing 38 that is secured to the front of machine spindle 32. Alternatively, spindle 32 and housing 38 may be formed as a one-piece unit. Each gripping finger 36 includes a head portion 40 the underside of which is brought into contact with the radial surface 11 of the retention knob 10 upon tool clamping.

Draw bar 34 is operable between a first forward position, where the head portion 40 of gripping fingers 36 are axially located beyond the inner end 39 of housing 38 thereby allowing gripping fingers 36 to radially open so as to allow passage of retention head 10 into housing 38, and a retracted position. Movement of draw bar 34 to the retracted position results in gripping fingers 36 being pulled into housing 38 thereby effecting a radial closing of the gripping fingers whereby the underside of the head portion 40 of each gripping finger 36 is brought into contact with the surface 11 of retention knob 10.

As an example of operation, with a rotary tool 30 placed on or against the tool spindle 32 and/or on housing 38 and draw bar 34 in the first forward position, tool securing device 2, with plunger 16 in the retracted position (i.e. diameter $d_2$ adjacent balls 12), is inserted into the central opening 42 and through the center hole 44 of rotary tool 30 such that the underside 7 of flange portion 6 is seated against the outer surface 46 of shoulder 48. In this manner, retention head 10 is also inserted into housing 38. Once inserted, knob 18, and thus plunger 16, is pushed inward to the advanced position (i.e. diameter $d_1$ adjacent balls 12) thereby forcing balls 12 radially outward by an amount whereby the balls 12 cannot pass through the center hole 44 and as such, the tool securing device 2 cannot be removed from the rotary tool 30. Draw bar 34 is then moved to a retracted position thereby closing gripping fingers 36 around retention head 10 and pulling rotary tool 30 into a clamped position against the tool spindle 32 and/or housing 38.

When the rotary tool 30 is removed, draw bar 34 is moved to the first forward position thereby releasing retention head 10 from the gripping fingers 36. Draw bar 34 may then continue forward movement until the front surface 50 of the draw bar contacts the distal end surface 13 of the retention head 10 to loosen or eject the rotary tool 30 from the tool spindle 32 and/or the housing 38. Loosening of the rotary tool 30 is achieved since the tool securing device 2 cannot move relative to the rotary tool 30 when the balls 12 are in the radially outward position effected by diameter $d_1$.

The tool securing device 2 may be removed from a rotary tool 30 by pulling knob 18 to position reduced diameter, $d_2$, adjacent balls 12 thereby rendering balls 12 movable inwardly from their radially outward position due to a reduced second diameter portion, $d_2$, wherein the balls 12 may at least partially reside in the cavity-like region 15. Tool securing device may then be pulled out of rotary tool 30 as any contact between the balls 12 and shoulder 48 will result in the balls 12 moving inwardly such that they will be clear to pass through center hole 44.

It should be understood that, alternatively, tool securing device 2 may be positioned in a rotary tool prior to placing the rotary tool on or against a tool spindle and/or on tool gripper housing.

With the present invention, no tools are required to tighten or loosen the tool securing device 2 from a tool spindle. Additionally, no tools are required to loosen or eject a rotary tool from the tool spindle and/or a tool gripper housing.

While the invention has been described with reference to preferred embodiments it is to be understood that the invention is not limited to the particulars thereof. The present invention is intended to include modifications which would be apparent to those skilled in the art to which the subject matter pertains without deviating from the spirit and scope of the appended claims.

What is claimed is:

1. An apparatus for securing a tool to a spindle of a machine in a tool-less manner, said apparatus comprising:
    an axially-extending body portion having a proximal flange portion and a distal knob portion, said body portion including an axially-extending internal bore; a plurality of radially-extending openings spaced about said body portion and being axially located on said body portion between said flange portion and said distal knob portion;
    a ball residing in and movable within each of said openings between a radially outward position and an inward position;
    an internal plunger residing in and movable within said internal bore between an advanced position and a retracted position;
    wherein said advanced position provides a first diameter of said plunger adjacent to and in contact with said balls whereby said balls are urged to said radially outward position, and wherein said retracted position provides a second diameter of said plunger adjacent said balls whereby said balls are movable to said inward position;
    wherein said plunger further includes a first end and a second end with a knob for effecting movement of said plunger being located at said first end and axially outward of said flange and said first and second diameters being located near to said second end.

2. The apparatus of claim 1 wherein said distal knob portion includes a radial contact surface.

3. The apparatus of claim 1 wherein said plunger further includes a seal located between said first diameter and said knob.

4. The apparatus of claim 1 wherein an underside of said flange portion seats against a tool when said tool is secured to said spindle.

5. The apparatus of claim 1 wherein said balls are retained in said body portion by a sleeve located on said body portion.

6. The apparatus of claim 1 wherein said openings are spaced equidistantly about said body portion.

7. The apparatus of claim 1 wherein said second diameter of said plunger creates a cavity-like region in said plunger wherein said balls can at least partially reside when said balls are in said inward position.

8. The apparatus of claim 1 wherein said knob for effecting movement is a push/pull knob.

* * * * *